United States Patent
Bendheim et al.

[19]
[11] Patent Number: 5,752,285
[45] Date of Patent: May 19, 1998

[54] HAND-HELD MULTI-PURPOSE IMPLEMENT

[76] Inventors: Paul Bendheim, 64 Hanadiv St., Herzliya, Israel, 46485; Alon Razgour, 67 Yasmin St., Migdal Ha'emek, Israel, 23502

[21] Appl. No.: 593,682

[22] Filed: Jan. 29, 1996

[51] Int. Cl.⁶ ........................................... B25G 3/12
[52] U.S. Cl. ................... 7/167; 7/114; 403/325; 403/327; 172/378; 294/51; 294/59
[58] Field of Search ........................ 7/114–116, 167; 403/321, 325, 327, 326; 172/370, 371, 375, 378; 294/51, 59, 55.5

[56] References Cited

U.S. PATENT DOCUMENTS

| | | | |
|---|---|---|---|
| 166,201 | 8/1875 | Gerfen | 294/51 X |
| 199,481 | 1/1878 | Thomas. | |
| 495,081 | 4/1893 | Witham | 172/378 X |
| 588,757 | 8/1897 | Simmons. | |
| 638,382 | 12/1899 | Dawing | 172/378 X |
| 684,406 | 10/1901 | Boivin. | |
| 758,971 | 5/1904 | Jordan | 172/378 X |
| 1,246,577 | 11/1917 | Fleming. | |
| 1,465,656 | 8/1923 | Swan | 172/378 X |
| 2,377,730 | 6/1945 | Vosbikian et al.. | |
| 2,794,689 | 6/1957 | Rubrum. | |
| 2,796,011 | 6/1957 | Schmidt. | |
| 2,821,724 | 2/1958 | Wurgaft | 7/167 |
| 2,884,278 | 4/1959 | Waara. | |
| 4,097,945 | 7/1978 | Scott. | |
| 4,114,216 | 9/1978 | Gatby et al.. | |
| 4,162,132 | 7/1979 | Kress et al.. | |
| 4,203,495 | 5/1980 | Crownover. | |
| 4,476,939 | 10/1984 | Wallace. | |
| 4,843,667 | 7/1989 | Hanly, Sr.. | |
| 4,930,377 | 6/1990 | Lester | 7/167 |
| 4,958,395 | 9/1990 | Basskohl | 7/167 X |
| 5,103,520 | 4/1992 | Mazzo. | |
| 5,185,992 | 2/1993 | Garcia. | |

FOREIGN PATENT DOCUMENTS

362397  10/1922  Germany ........................ 7/167

*Primary Examiner*—D. S. Meislin
*Attorney, Agent, or Firm*—Browdy and Neimark

[57] ABSTRACT

A hand-held, multi-purpose implement including a handle provided with a resealable storage container and an adaptor head having at least a pair of insert receiving sockets. A set of interchangeable inserts adapted for storage in the storage container when not in use each have a working end portion and a tang portion receivable in an insert receiving socket. The adaptor head includes a securing device for releasably securing at least two of the inserts in its insert receiving sockets so as to enable the creation of different tools depending on the combination of inserts secured therein.

11 Claims, 8 Drawing Sheets

HAND-HELD MULTI-PURPOSE IMPLEMENT

FIELD OF THE INVENTION

The invention relates to hand-held multi-purpose implements for performing different tasks in and around the house. Particularly, the present invention pertains to a ground working implement assembly having an adaptor head in which one or more interchangeable inserts are secured therein for the creation of different tools depending on the number, the type, the relative location and the orientation of the inserts secured in the adaptor head.

BACKGROUND OF THE INVENTION

Hand-held multi-purpose implements for performing different gardening and similar crop cultivating tasks by means of the provision of a spade, a hoe, a rake and other tools are known.

These implements can be divided as falling into one of two types as follows:

The first type of implement, for example, as described in U.S. Pat. Nos. 199,481, 588,757, 1,246,577, 2,794,689, 2,796,011, 4,162,132, 4,114,216, 4,203,495 and 5,185,992 comprises a common handle which can be fitted with any one of an assortment of interchangeable tool heads.

The second type of implement, for example, as described in U.S. Pat. Nos. 684,406, 2,377,730, 2,884,278, 4,097,945, 4,476,939 and 5,103,520 comprises a common handle fitted with an assortment of tool heads which can be each manipulated between an operative position for performing its specific ground working task and an inoperative stowed away position.

U.S. Pat. No. 4,843,667 describes a combination rake, broom and pruning knife having a handle having a hollowed portion at either end and a detachable broom handle which when in place serves as a backing for the rake tines of the rake. One of the hollow ends is employed for stowage of rake tines which are retracted thereinto when not in use whilst the other hollow end is employed for stowage of the blade end of the pruning knife when not in use.

SUMMARY OF THE INVENTION

The object of the invention is to provide a convenient, space saving, hand-held multi-purpose implement having a handle provided with a storage container for storing a set of inserts and an adaptor head capable of receiving two or more inserts such that different tools can be created depending on the number, the type, the relative location and the orientation of the inserts inserted into the adaptor head.

In accordance with the teachings of the present invention, there is provided a hand-held multi-purpose implement comprising:

(a) a handle provided with a resealable storage container and an adaptor head having at least a pair of insert receiving sockets;

(b) a set of interchangeable inserts adapted for storage in said storage container when not in use, each interchangeable insert having a working end portion and a tang portion receivable in an insert receiving socket; and (c) securing means for releasably securing two or more interchangeable inserts in said insert receiving sockets so as to enable the creation of different tools depending on the combination of inserts secured in said adaptor head.

It is envisaged that implements can be provided with sets of inserts adapted for different tasks in or around the house. For example, one implement can be provided with a set of inserts for creating tools for performing gardening tasks whilst another implement can be provided with a set of inserts for creating tools for performing barbecuing tasks. In addition other implements can be adapted for performing mechanical repairs, sports activities, camping, military purposes, and the like.

In a preferred embodiment of the implement designed for performing gardening tasks, the adaptor head includes three insert receiving sockets and the set of inserts includes six inserts in the form of three elongated prong-like inserts, a pair of inserts having arcuate working end portions and a single insert having a generally rectangular shaped working end portion. In the first instance, a single prong-like insert inserted into the adaptor head creates a poker-like tool. Whilst, in the second instance, the three prong-like inserts inserted into the adaptor head create a fork-like tool. And finally, in the third instance, the generally rectangular shaped insert in the center insert receiving socket and the arcuate shaped inserts in the outer insert receiving sockets create a spade-like tool when inserted in a predetermined orientation.

Implements for performing the same task, say, gardening, can be provided with handles of different lengths depending on where the tasks are to be performed. For example, an implement for performing gardening tasks in the home can be provided with a short handle of about 30 cm in length. Whilst, an implement for performing the same tasks in the garden can be provided with a long handle of about 150 cm in length. In the former case, nearly the entire handle doubles up as the storage container of the inserts. In contrast, in the latter case, only a portion of the handle doubles up as the storage container. In the former case, the implement can be further provided with a quick connect extension rod for extending its short handle into a long handle.

In one preferred embodiment of the invention, the securing means comprises a substantially rigid locking member having a user manipulatable actuating member, the locking member being biased into a locking position for securing inserts in the insert receiving sockets and displaceable to at least one opening position enabling an insert to be inserted into an insert receiving slot or withdrawn therefrom.

In another preferred embodiment of the invention, the securing means includes a substantially resilient locking member having a user manipulatable actuating member, the locking member being biased into a locking position for securing inserts in the insert receiving sockets, displaceable to at least one first opening position enabling an insert to be inserted into an insert receiving slot or withdrawn therefrom and elastically deformable into a second opening position enabling an insert to be inserted into an insert receiving slot or withdrawn therefrom.

BRIEF DESCRIPTION OF THE DRAWINGS

For a better understanding of the present invention and to show how the same can be carried out in practice, reference will now be made, by way of a non-limiting example only, to the accompanying drawings in which.

DETAILED DESCRIPTION OF THE DRAWINGS

Figure 1:
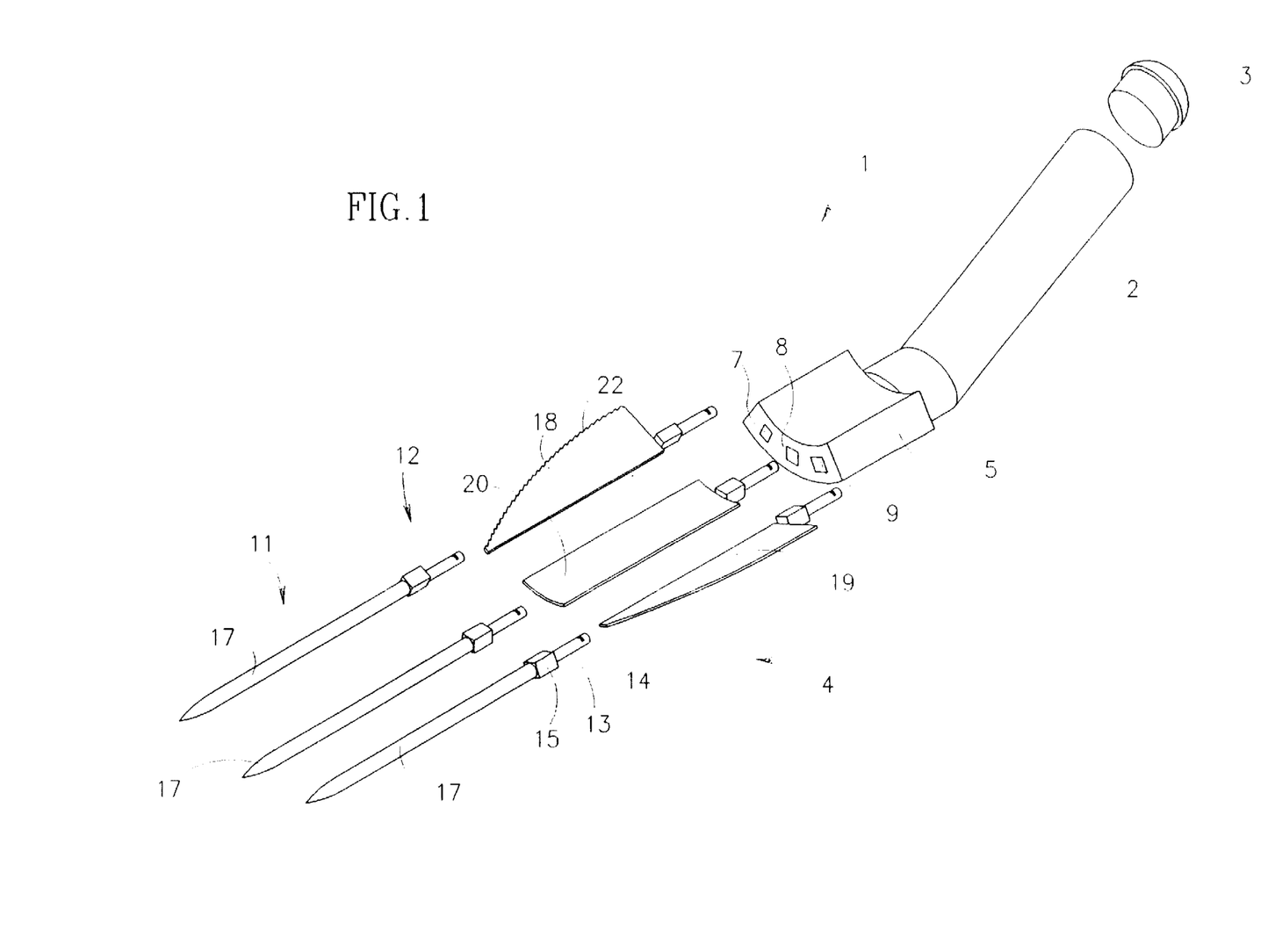
FIG. 1 is a perspective view of a hand-held, multi-purpose implement with its associated set of interchangeable inserts for performing gardening tasks.
Figure 2:
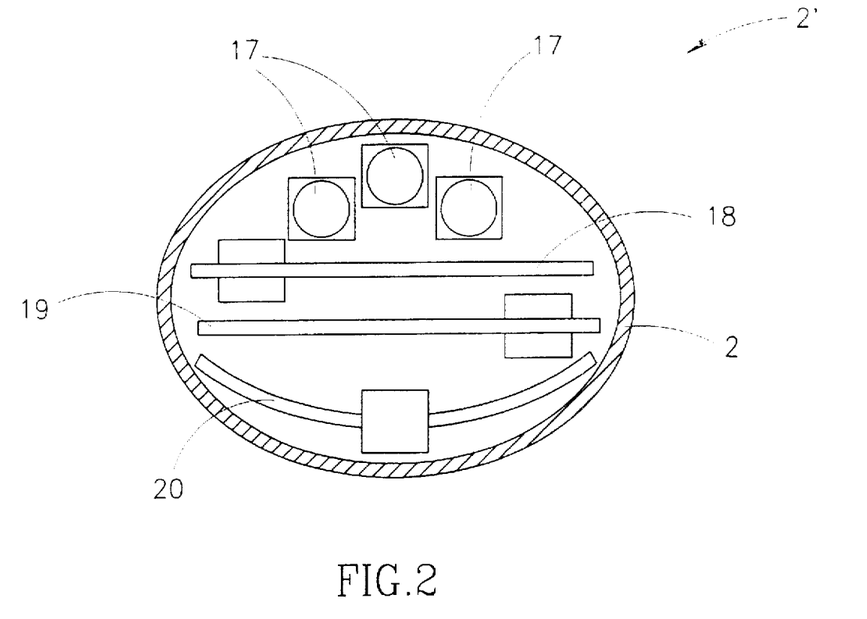
FIG. 2 is a cross-sectional view of the handle of the implement of FIG. 1 when storing the set of inserts.
Figure 3A:
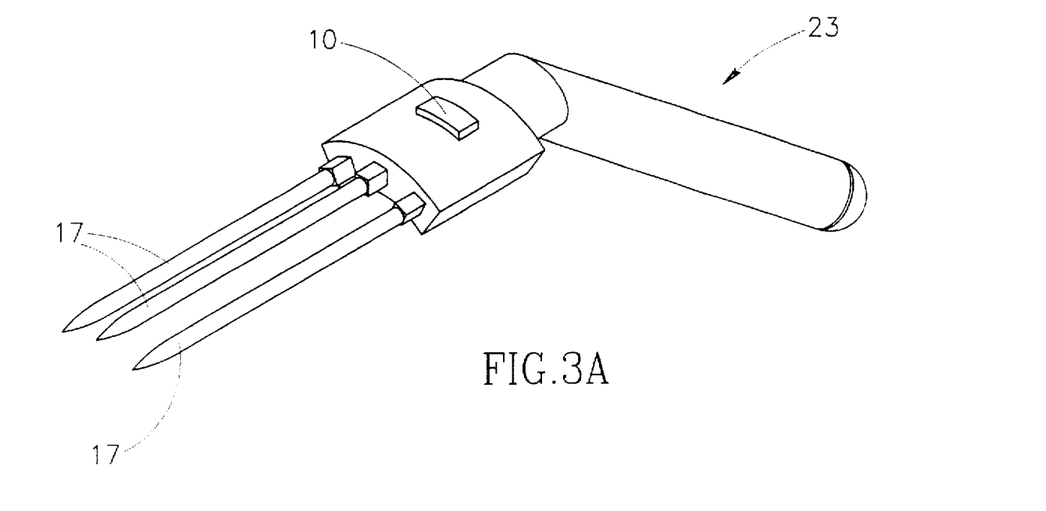
FIG. 3A is a perspective view of the implement of FIG. 1 having inserts inserted in its adaptor head so as to create a fork-like tool.

FIGS. 1, 2 and 3 show a hand-held multi-purpose implement 1 including a hollow handle 2 sealed by a cap 3 in a press fit manner. The handle 2 acts a storage container 2' for storing a set of interchangeable inserts 4 when not in use (FIG. 2). The handle 2 is provided with an adapter head 5 having a convex shape relative to its longitudinal axis and formed with three insert receiving sockets 7, 8 and 9 for interchangeablely receiving inserts so as to create any one of a wide range of tools. The adaptor head 5 is angularly disposed relative to the longitudinal axis of the handle 2 such that a user can comfortably manipulate a tool so as to perform its specific task. Insertion of the inserts into the insert receiving sockets 7, 8 and 9 and their subsequent withdrawal therefrom is achieved by thumb manipulation of an actuating member 10 (FIG. 3A) connected to a locking member (not shown) housed with the adaptor head 5 for securing the inserts therein.

Inasmuch that the inserts are identical except for their ground working portions 11 as described hereinbelow, each insert includes a tang portion 12 in the form of a trailing circular shank 13 provided with a transverse groove 14 by which the insert is engaged to the locking member of the adaptor head 5 and a leading square head 15 for ensuring that the insert cannot rotate after insertion in one of the insert receiving sockets. The intermediate square head 15 is also employed for determining the extent that the insert can be inserted into one of the insert receiving sockets. It will be readily appreciated that the insert receiving sockets 7, 8 and 9 have similar shapes and dimensions as the tang portions of the inserts, namely, a trailing circular bore and a leading square aperture.

Figure 3B:
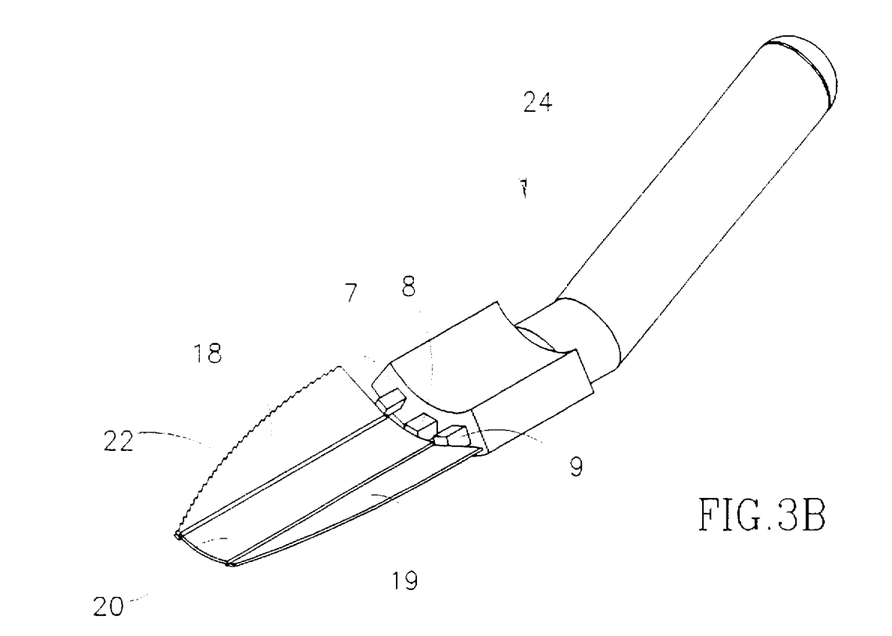
FIG. 3B is a perspective view of the implement of FIG. 1 having inserts inserted in its adaptor head so as to create a spade-like tool.
Figure 3C:
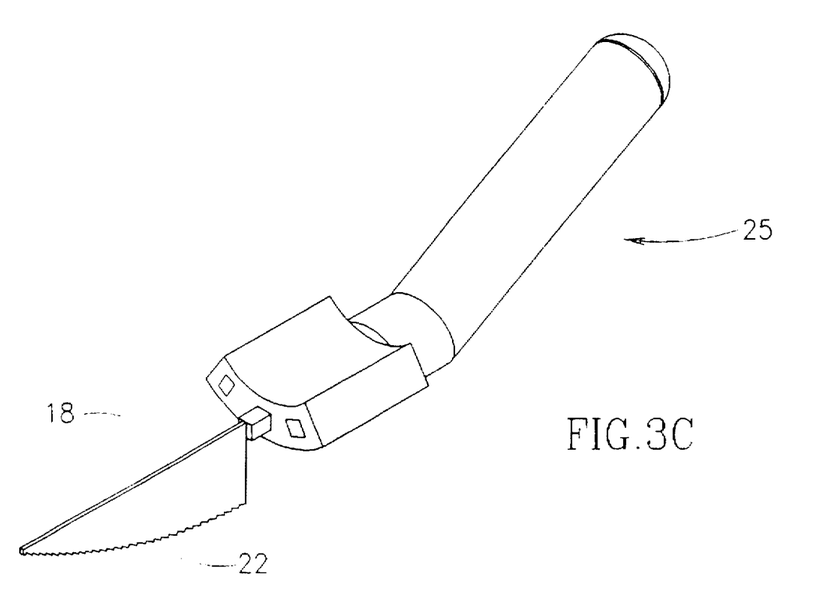
FIG. 3C is a perspective view of the implement of FIG. 1 having an insert inserted in its adaptor head so as to create a knife-like tool.

The set of inserts 4 includes six inserts in the form of three identical inserts 17 having prong-like ground working portions, left and right inserts 18 and 19, respectively, having tapered straight ground working portions and a single insert 20 having a slightly arcuate, generally rectangular shaped ground working portion. The ground working portion of the insert 18 is provided with a serrated edge 22. Thus, the set of tools 4 can be employed so as to create a fork-like tool 23 as shown in FIG. 3A by the insertion of the three prong-like inserts 17 in the insert receiving sockets 7, 8 and 9 of the adaptor head 5. Whilst not being shown, it will be readily appreciated that a single prong-like insert 17 inserted into any one of the insert receiving sockets would create a poker-like tool. Alternatively, the set of tools 4 can be employed so as to create a spade-like tool 24 as shown in FIG. 3B by the insertion of the insert 18 in the insert receiving socket 7, the insert 20 in the insert receiving socket 8 and the insert 19 in the insert receiving socket 9. And still again, the set of tools 4 can be employed as shown in FIG. 3C to create a knife-like tool 25 by the downward oriented insertion of the serrated edge insert 18 in any one of the insert receiving sockets.

Figures 4A, 4B, 4C:
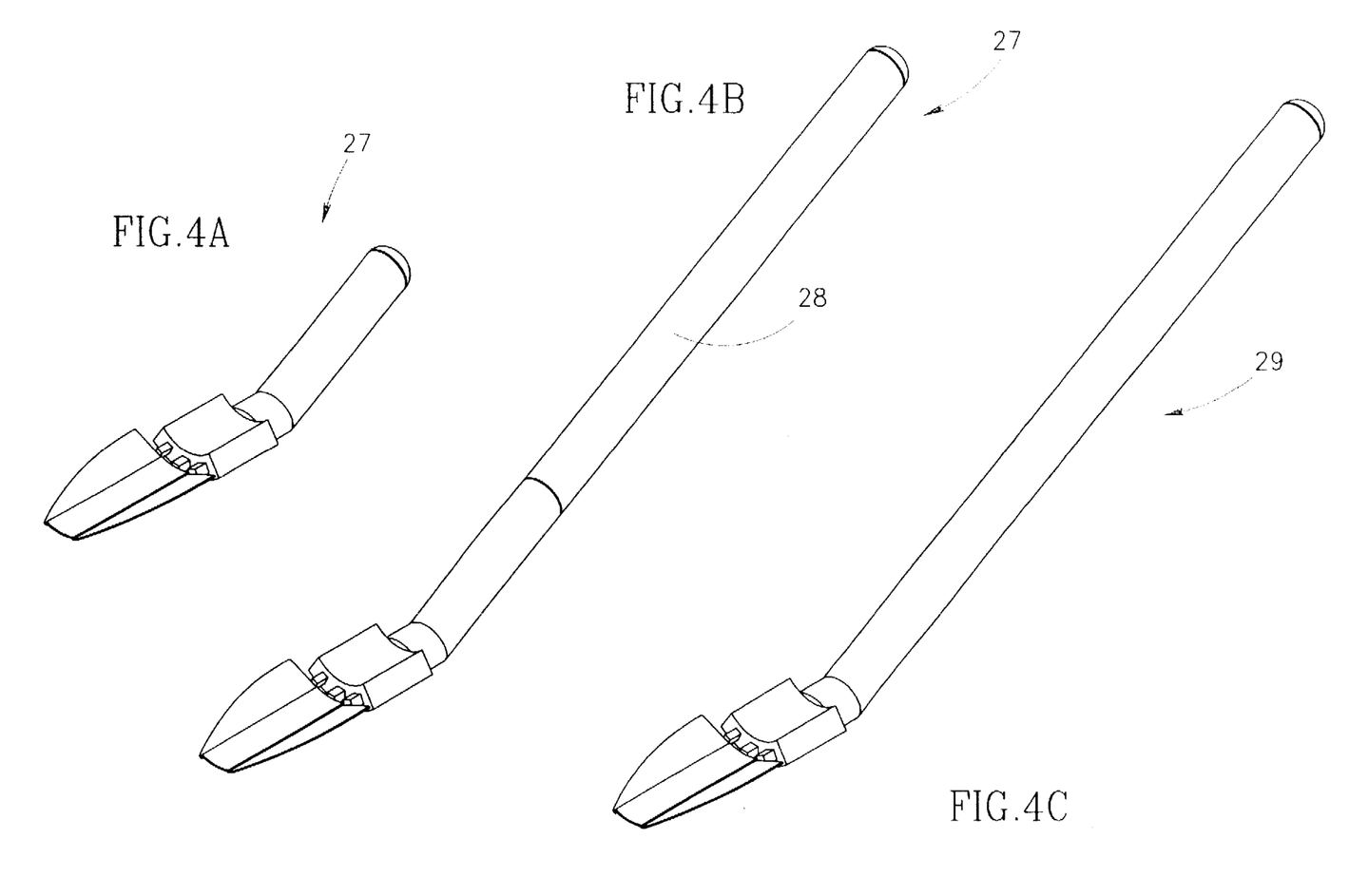
FIG. 4A is a perspective view of the implement of FIG. 1 having a short handle.
FIG. 4B is a perspective view of the implement of FIG. 4A provided with a quick fit extension rod so as to form a long handle.
FIG. 4C is a perspective view of the implement of FIG. 1 having a long handle.

FIGS. 4A–4C show that the hand-held multi-purpose implement 1 can be provided with handles of different lengths depending on where it is designed to be used. FIG. 4A shows an implement 27 with a short handle of about 30 cm for performing gardening tasks in the home. FIG. 4B shows the implement 27 with provided with a quick connect extension rod 28 for converting it for use in an outside garden. FIG. 4C shows an implement 29 provided with a long handle of about 150 cm for performing gardening tasks in the garden.

Figure 5A:
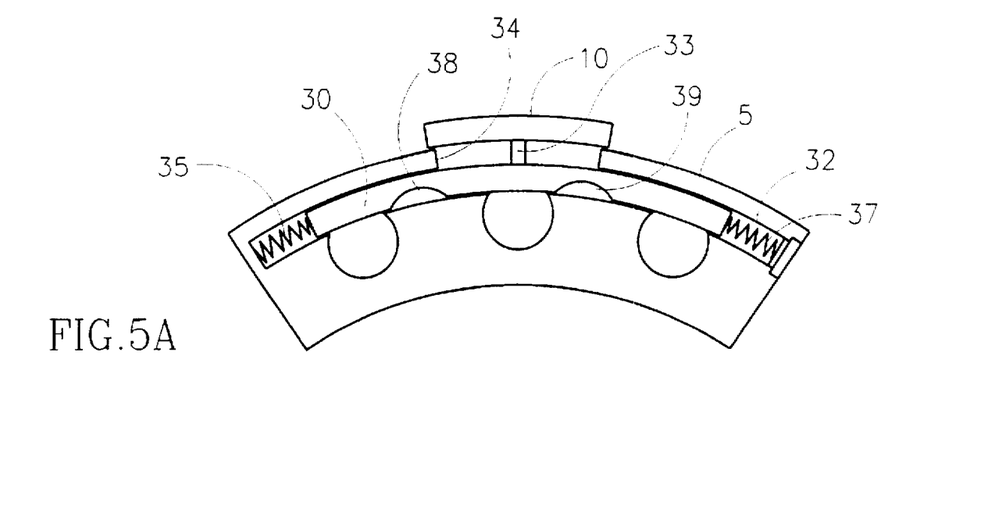
FIG. 5A is a cross sectional view of a first embodiment of the adapter head of the implement of FIG. 1 incorporating a locking member shown in its locking position for securing inserts in its insert receiving sockets.
Figure 5B:
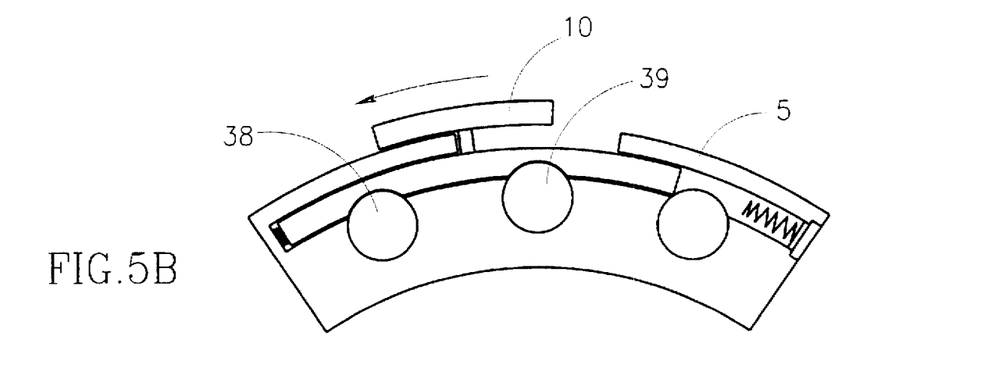
FIG. 5B is a cross sectional view of the adapter head of FIG. 5A with its locking member shown in a first opening position enabling the insertion or withdrawal of inserts.
Figure 5C:
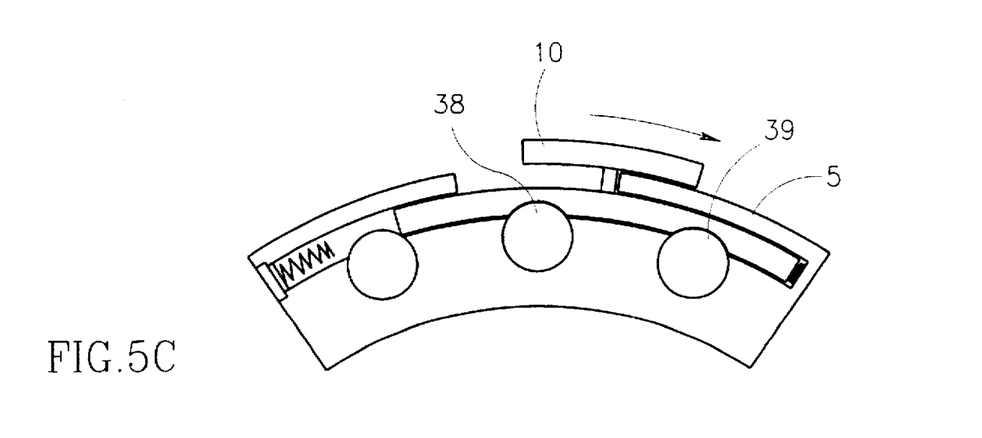
FIG. 5C is a cross sectional view of the adapter head of FIG. 5A with its locking member shown in a second opening position enabling the insertion or the withdrawal of inserts.
Figure 6A:
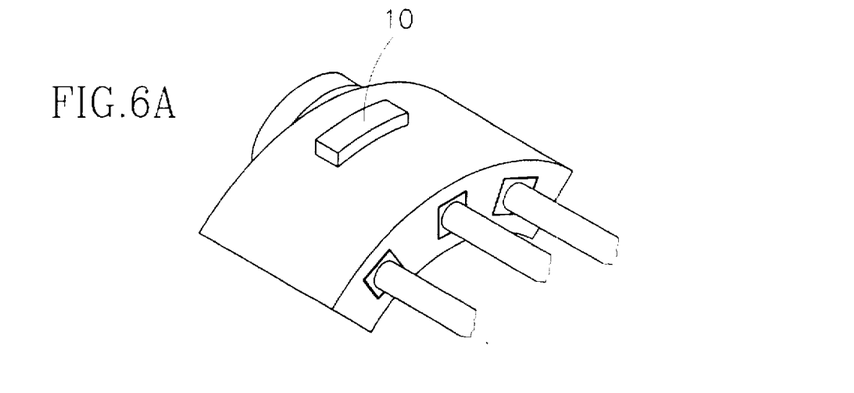
FIGS. 6A–6C are perspective views of the adapter head corresponding to FIGS. 5A–5C.
Figure 6B:
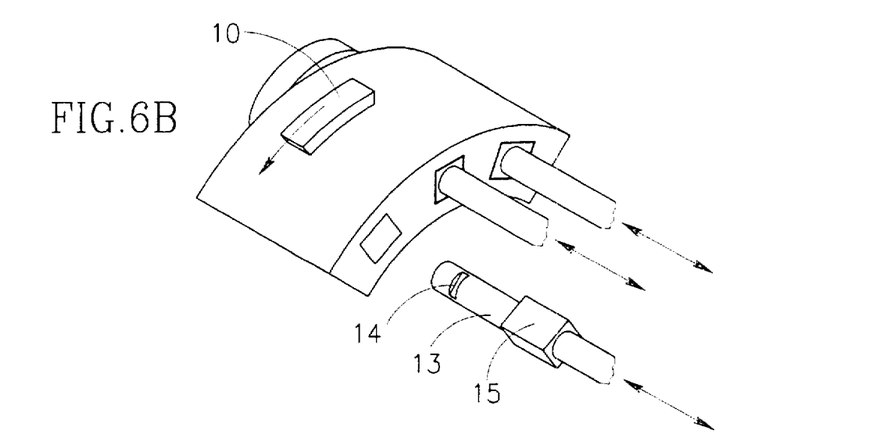
Figure 6C:
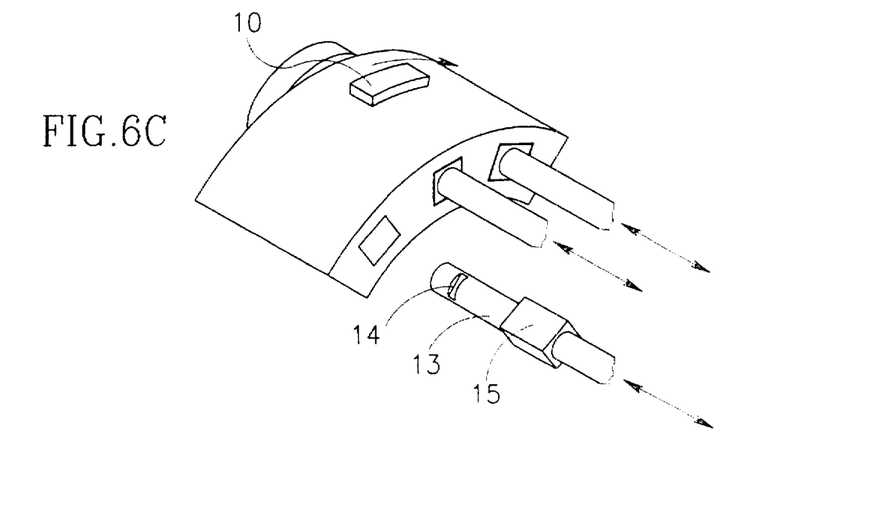

FIGS. 5A–5C show a substantially rigid arcuate locking member 30 housed in a similar shaped cavity 32 prepared in the adaptor head 5 and connected to the actuating member 10 by a stem 33 passing through a rectangular slot 34 provided in the outer surface of the adaptor head 5. As can be seen in the Figures, the locking member 30 is disposed on the side of the insert receiving sockets towards the outer surface of the adaptor head 5.

The locking member 30 is biased into a locking position (FIG. 5A) by means of a pair of springs 35 and 37 disposed between its ends and the end walls of the cavity 32. In this position, the locking member 30 secures up to three inserts previously inserted in the adaptor head 5 by engaging their transverses grooves 14 so as to prevent their withdrawal. It should be noted that in this position, the locking member 30 prevents full insertion of the inserts into the adaptor head 5 by virtue of it stopping the ends of their shanks 13.

The locking member 30 is formed with a pair of cut-outs 38 and 39 deployed in such a fashion that when the actuating member 10 is fully displaced to either the left (FIG. 5B) or the right (FIG. 5C) so as to abut against one of the side walls of the slot 34, each one of the cut-outs 38 and 39 is aligned with the trailing circular bore of one of the insert receiving sockets enabling the insertion of an insert thereinto or the withdrawal of an insert therefrom. In addition, the full displacement of the actuating member 10 is such that the end of the locking member 30 remote from the at least partially compressed spring 35 or 37 sufficiently clears the trailing circular bore of the insert receiving socket also remote therefrom such that an insert can be inserted thereinto or removed therefrom.

FIGS. 7A–7D show a resilient substantially straight locking member 40 housed in a similar shaped cavity 42 prepared in the adaptor head 5 and connected to the actuating member 10 by a stem 43 passing through a rectangular slot 44 provided in the inner surface of the adaptor head 5. The base of the actuating member 10 sits in a long shallow recess 45 constituting the outer portion of the slot 44. As can be seen in the Figures, the locking member 40 is disposed so as to lie between the insert receiving socket 8 on one side and the insert receiving sockets 7 and 9 on the other side.

The locking member 40 is biased into a locking position (FIG. 7A) by means of a pair of springs 47 and 48 disposed on either side of the stem 43 and urged against the side walls of the slot 44. In this position, the locking member 40 secures up to three inserts previously inserted in the adaptor head 5 by engaging their transverses grooves so as to prevent their withdrawal. It should be noted that in this position, the locking member 40 prevents full insertion of the inserts into the adaptor head 5 by virtue of it stopping the ends of their shanks 13.

Figure 7A:
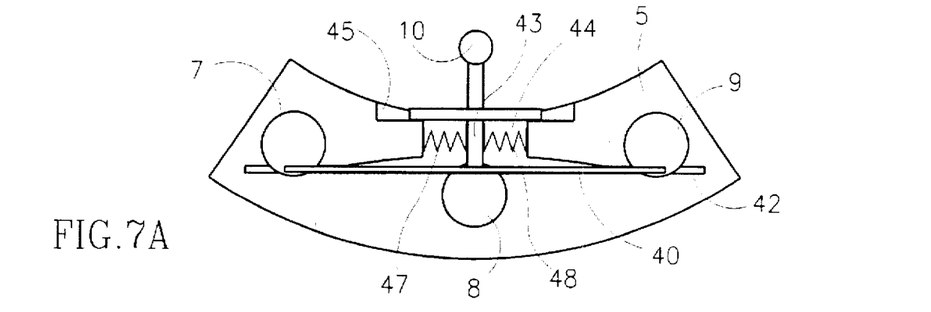
FIG. 7A is a cross sectional view of a second embodiment of the adapter head of the implement of FIG. 1 incorporating a locking member shown in its locking position for securing inserts in its insert receiving sockets.
Figure 7B:
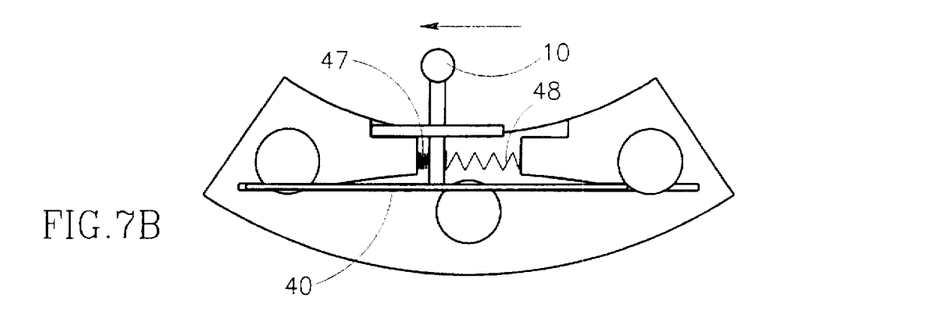
FIG. 7B is a cross sectional view of the adapter head of FIG. 7A with its locking member shown in a first opening position enabling the insertion or withdrawal of an insert in its right insert receiving socket.
Figure 7C:
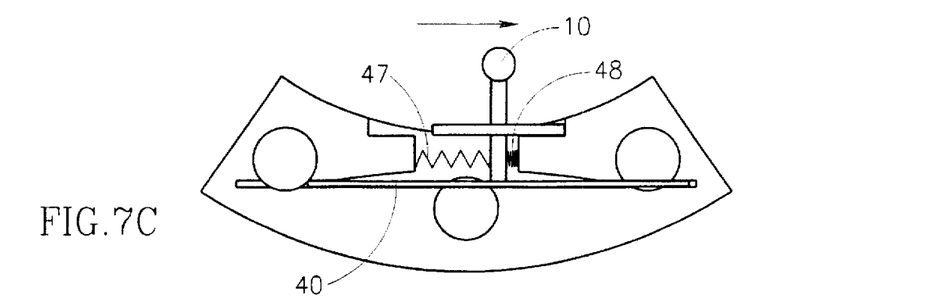
FIG. 7C is a cross sectional view of the adapter head of FIG. 7A with its locking member shown in a second opening position enabling the insertion or withdrawal of an insert in its left insert receiving socket.
Figure 7D:
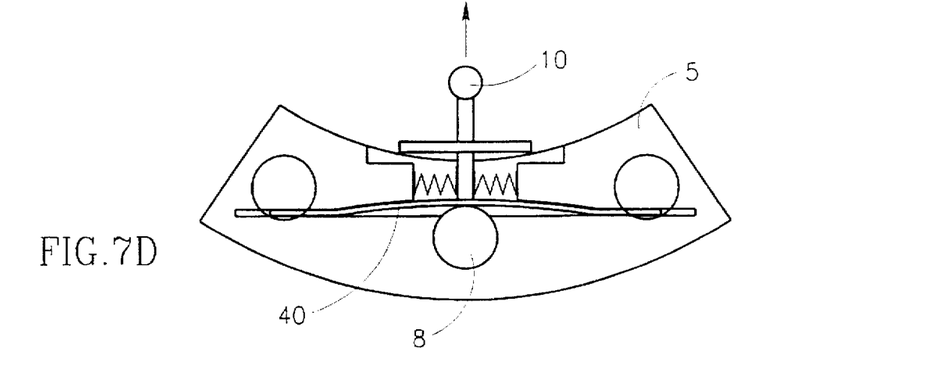
FIG. 7D is a cross sectional view of the adapter head of FIG. 7A with its locking member shown in a third opening position enabling the insertion or withdrawal of an insert in its middle insert receiving socket.

When the actuating member 10 is fully displaced to either the left (FIG. 7B) or the right (FIG. 7C) such that its base abuts against one of the side walls of the recess 45, the end of the locking member 40 remote from the at least partially compressed spring 47 or 48 sufficiently clears the trailing circular bore of the insert receiving socket also remote therefrom such that an insert can be inserted thereinto or removed therefrom. When the actuating member 10 is pulled outward relative to the adaptor head 5 (FIG. 7D), the locking member 40 is sufficiently deformed that it clears the trailing circular bore of the insert receiving socket 8 such that an insert can be inserted thereinto or removed therefrom. On release of the actuating member 10, the locking member 40 assumes its initial shape and position as shown in FIG. 7A.

FIGS. 8A–8D show a resilient substantially straight locking member 49 housed in a similar shaped cavity 50 prepared in the adaptor head 5 and connected to the actuating member 10 by a pair of legs 52 and 53 passing through a rectangular slot 54 provided in the outer surface of the adaptor head 5. A long shallow recess 55 constitutes the outer portion of the slot 54. As can be seen in the Figures, the locking member 49 is disposed so as to lie between the insert receiving socket 8 on one side and the insert receiving sockets 7 and 9 on the other side.

The locking member 49 is biased into a locking position (FIG. 8A) by means of a pair of bulging leaf springs 57 and 58 disposed between the outer surfaces of the legs 52 and 53 and their corresponding side walls of the slot 54. In this position, the locking member 49 secures up to three inserts previously inserted in the adaptor head 5 by engaging their transverses grooves so as to prevent their withdrawal. It should be noted that in this position, the locking member 49 prevents full insertion of the inserts into the adaptor head 5 by virtue of it stopping the ends of their shanks 13.

Figure 8A:
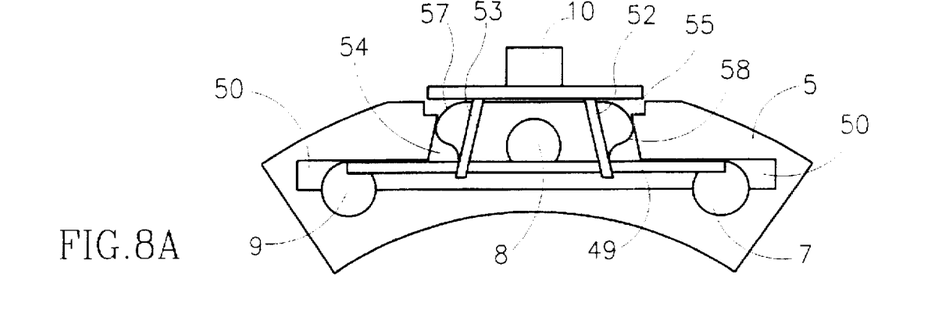
FIG. 8A is a cross sectional view of a third embodiment of the adapter head of the implement of FIG. 1 incorporating a locking member shown in its locking position for securing inserts in its insert receiving sockets.
Figure 8B:
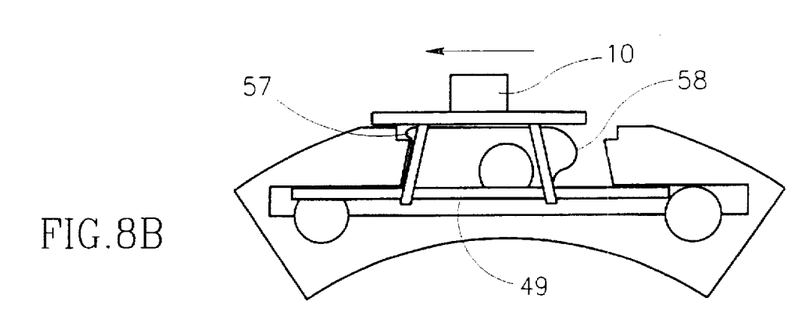
FIG. 8B is a cross sectional view of the adapter head of FIG. 8A with its locking member shown in a first opening position enabling the insertion or withdrawal of an insert in its right insert receiving socket.
Figure 8C:
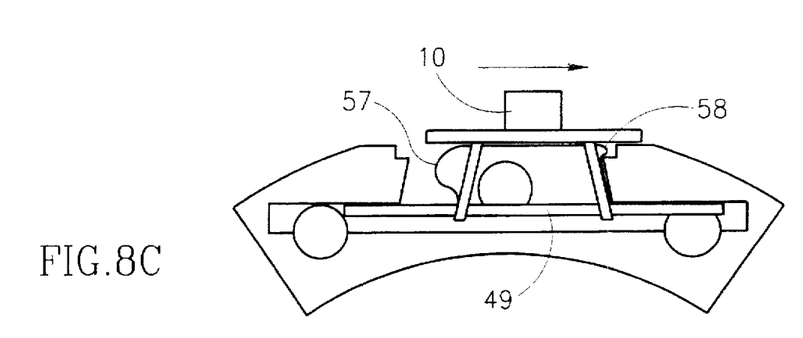
FIG. 8C is a cross sectional view of the adapter head of FIG. 8A with its locking member shown in a second opening position enabling the insertion or withdrawal of an insert in its left insert receiving socket.
Figure 8D:
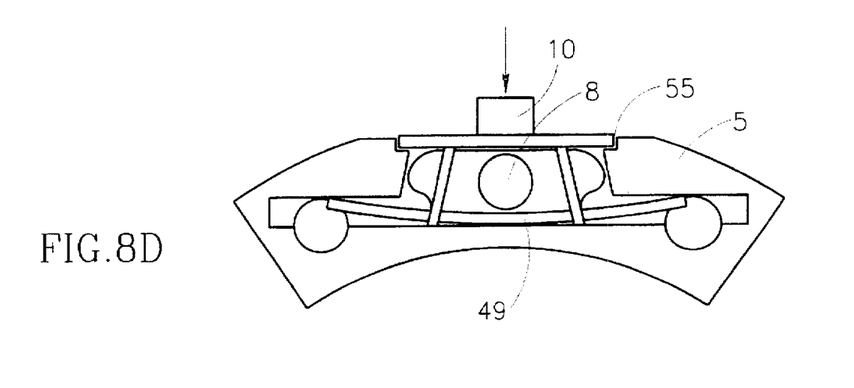
FIG. 8D is a cross sectional view of the adapter head of FIG. 8A with its locking member shown in a third opening position enabling the insertion or withdrawal of an insert in its middle insert receiving socket.

When the actuating member 10 is fully displaced to either the left (FIG. 8B) or the right (FIG. 8C), the end of the locking member 49 remote from the at least partially compressed leaf spring 57 or 58 sufficiently clears the trailing circular bore of the insert receiving socket also remote therefrom such that an insert can be inserted thereinto or removed therefrom. When the actuating member 10 is pushed inward relative to the adaptor head 5 (FIG. 8D) such that its base sits in the recess 55, the locking member 49 is sufficiently deformed that it clears the trailing circular bore of the insert receiving socket 8 such that an insert can be inserted thereinto or removed therefrom. On release of the actuating member 10, the locking member 49 assumes its initial shape and position as shown in FIG. 8A.

While the invention has been described with respect to a limited number of embodiments, it will be appreciated that many variations, modifications and other applications of the invention can be made by those ordinarily skilled in the art.

We claim:

1. A hand-held, multi-purpose implement comprising:
   (a) a handle provided with a resealable storage container and an adaptor head having at least a pair of insert receiving sockets;
   (b) a plurality of interchangeable inserts adapted for storage in said storage container when not in use, each insert of said set of interchangeable inserts having a working end portion and a tang portion receivable in an insert receiving socket of said insert receiving sockets, said plurality of interchangeable inserts including inserts with different working end portions; and
   (c) securing means for releasably securing each said tang portion in said insert receiving sockets, wherein selected combinations of said plurality of interchangeable inserts secured in said adaptor head create different tools;
   wherein said plurality of inserts includes at least three prong-like inserts, at least two inserts having an arcuate working portion and at least one insert having a rectangular shaped working portion.

2. An implement according to claim 1 wherein said securing means comprises a substantially rigid locking member having a user manipulatable actuating member, said locking member being biased into a locking position for securing a plurality of said inserts in said insert receiving sockets and displaceable to at least one opening position enabling said tang portion of an insert to be inserted into a corresponding insert receiving socket of said insert receiving sockets or withdrawn therefrom.

3. An implement according to claim 1 wherein said securing means includes a substantially resilient locking member having a user manipulatable actuating member, said locking member being biased into a locking position for securing said plurality of inserts in said insert receiving sockets, said locking member being displaceable to at least one first opening position enabling an insert to be inserted into an insert receiving socket or withdrawn therefrom, said locking member being elastically deformable into a second opening position enabling an insert to be inserted into an insert receiving socket or withdrawn therefrom.

4. An implement according to claim 3 wherein the deforming of said locking member between said locking position and said second opening position is by means of a force on said actuating member being directed away from said adaptor head.

5. An implement according to claim 3 wherein the deforming of said locking member between said locking position and said second opening position is by means of a force on said actuating member being directed toward said adaptor head.

6. An implement according to claim 1, wherein at least one of said two inserts having an arcuate working portion has a serrated edge.

7. An implement according to claim 1 wherein said securing means comprises a substantially rigid locking member having a user manipulatable actuating member, said locking member being biased into a locking position for securing a plurality of said inserts in said insert receiving sockets and displaceable to at least one opening position enabling said tang portion of an insert to be inserted into a corresponding insert receiving socket of said insert receiving sockets or withdrawn therefrom.

8. An implement according to claim 1 wherein said adaptor head is angularly disposed relative to the longitudinal axis of said handle.

9. An implement according to claim 1 wherein said adaptor head is convex shaped relative to the longitudinal axis of said handle.

10. An implement according to claim 1 wherein the length of said handle in the order of about 30 cm to about 150 cm.

11. An implement according to claim 1 further comprising an extension rod for extending said handle.

* * * * *